Aug. 30, 1932.  F. V. SJOLANDER  1,874,371
COLLAPSIBLE WIRE REEL
Filed April 1, 1930   2 Sheets-Sheet 1

WITNESSES

INVENTOR
Frank V. Sjolander
BY
ATTORNEYS

Aug. 30, 1932. F. V. SJOLANDER 1,874,371
COLLAPSIBLE WIRE REEL
Filed April 1, 1930   2 Sheets-Sheet 2
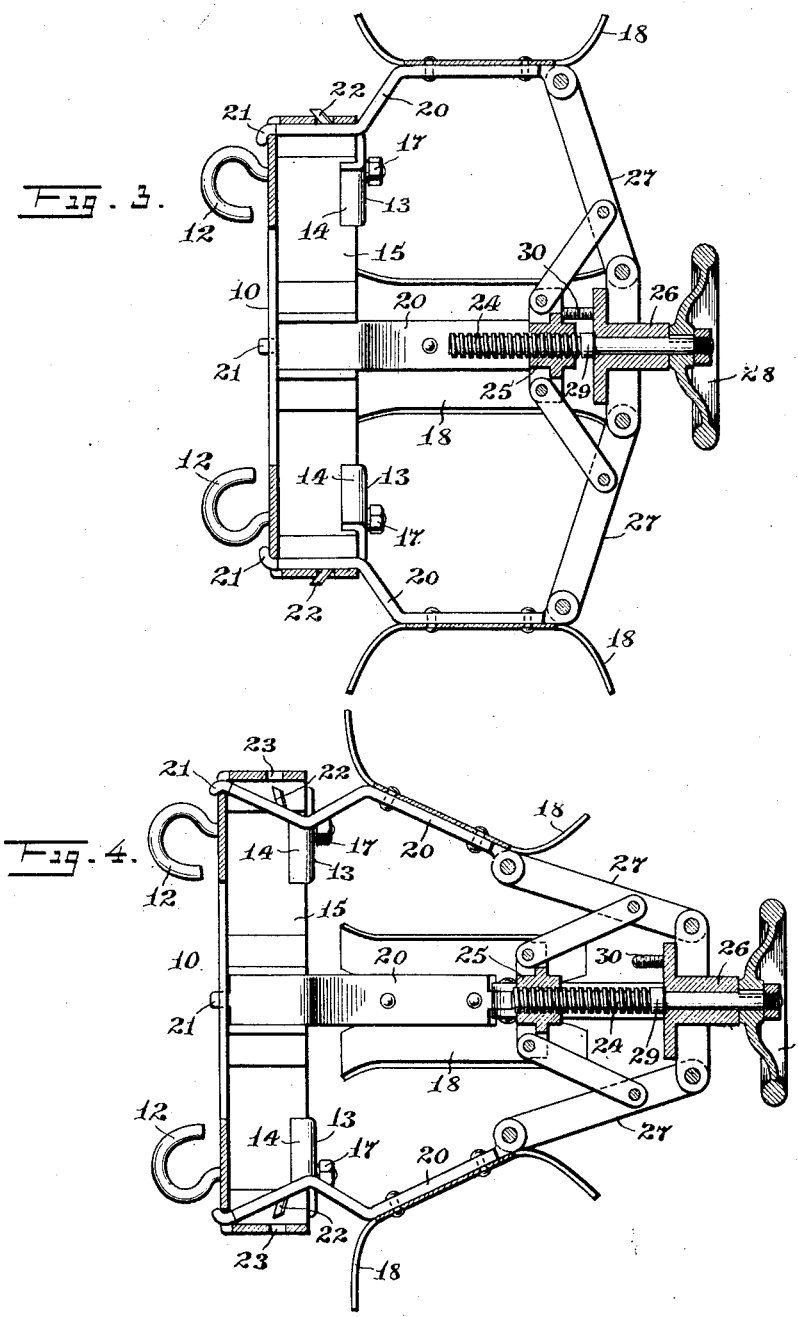
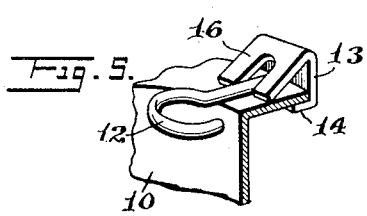
INVENTOR
Frank V. Sjolander
BY
ATTORNEYS Patented Aug. 30, 1932

1,874,371

UNITED STATES PATENT OFFICE

FRANK V. SJOLANDER, OF JAMESTOWN, KANSAS

COLLAPSIBLE WIRE REEL

Application filed April 1, 1930. Serial No. 440,774.

This invention relates to an attachment which may be applied to a power driven element such as an automobile wheel and forming a reel on which a quantity of material, such as telephone wire, may be wound in the form of a coil.

The invention has for its general object the provision of improvements in a reel of the indicated character, whereby greater facility will be had in putting the reel in condition for winding or reeling the material thereon in the form of a coil, and for removing the coil therefrom.

With the foregoing and other objects in view, the invention resides in the particular provision, construction, combination and operation of the parts hereinafter fully described and illustrated in the accompanying drawings, in which Figure 1 is a front elevation of a reel attachment constructed in accordance with the invention and showing the same applied to an automobile wheel;

Figure 3 is a central longitudinal section of the reel attachment in set up condition;

Figure 4 is a view similar to Figure 3 showing the reel attachment in collapsed condition;

Figure 5 is a perspective view of one of the details of the device.

Figure 1:
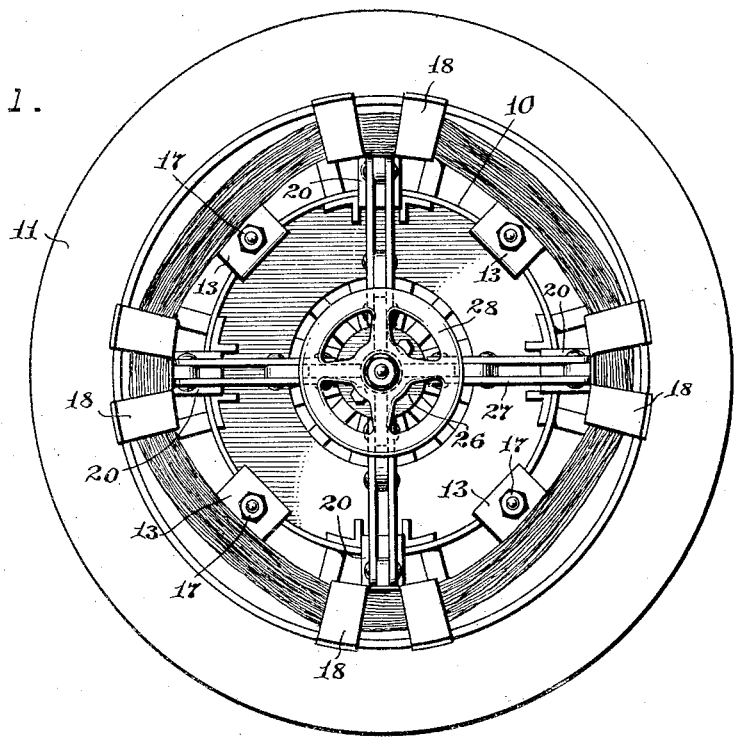
Figure 2:
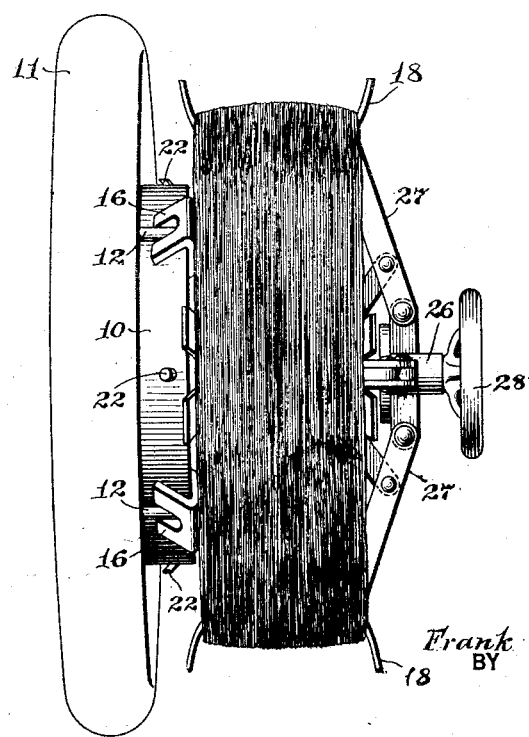
Figure 2 is an edge view of the reel attachment and the automobile wheel shown in Figure 1.

Referring more particularly to the drawings, it will be apparent that the reel attachment includes an annular reel base section 10. The base section 10 is provided with means to secure the same to a power driven rotary element such as a rear automobile wheel 11. The attaching means is in the form of shackles, consisting of spoke engaging hooks 12 carried by the base section 10 and projecting laterally therefrom, and clips 13 arranged respectively on the shanks of the hooks 12. Each clip 13 has a flange 14 engageable with the flange 15 of the base section 10, and a notched end 16 engageable with the related shank of the hook. The shank of each hook 12 has a nut 17 thereon which exerts pressure on the related clip 13 to hold both the clip and the hook 12 in place, the hook being prevented from turning by reason of the employment of the related clip 13. The hooks 12 may be readily detached from the base section, and when detached are engaged respectively with the spokes of the wheel 11, and the clips 13 are then placed on the shanks of the hooks, after which the nuts 17 are applied to securely hold the hooks in engagement with the spokes of the wheel.

The base section 10 carries at one side drum sections 18 on which a coil of wire 19 may be wound or reeled. Each drum section 18 has an arm 20 of offset formation, formed with a hooked terminal 21 adapted to be engaged in one of a plurality of holes in the base section 10. It will further be understood that the drum sections 18 may be detachably connected with the base section 10, and may also have relative movement, with respect to each other, radially inward and radially outward. It will further be understood that the drum sections 18 may be brought to the positions shown in Figure 3 so that material may be wound or reeled thereon in the form of a coil, as shown in Figure 3. When the drum sections 18 are in the positions shown in Figure 3, pins 22 respectively on the arm 20 will be disposed respectively in holes 23 in the flange 15 of the base section 10. It will be further apparent that the drum sections 18 may be brought to a collapsed relationship, as shown at Figure 4, to make it possible to remove the coil of wire from the drum sections 18.

In order to impart relative movement to the drum sections 18 to put them in the set up relation, and also to put them in the collapsed relation, there is provided manually operable means presently to be described. A screw 24 is provided which is in threading engagement with a nut 25, and which rotates in a sleeve 26. A toggle joint 27 is operatively connected with the nut 25, sleeve 26 and the arms 20. A hand wheel 28 is keyed or secured in any other suitable manner to the screw 24 and bears on one end of the sleeve 26. The screw 24 is held against axial movement by the hand wheel 28 and a collar 29 on the screw which also bears against the sleeve 26. It will now be apparent that, by turning the hand wheel 28, the nut 25 will be moved axially along the screw 24, and through the intervention of the toggle joint 27 will cause the drum sections 18 to be brought simultaneously, either in the set relationship as shown in Figure 3, or also in the collapsed relationship as shown in Figure 4.

In accordance with another feature of the invention, the sleeve 26 carries a stop 30 which is engageable with the nut 25 to limit the movement of the drum sections 18 to the set relationship shown in Figure 3. It will also be apparent that the pins 22 on the arms 20 will prevent any sidewise movement of the arms 20, due to the fact that the pins 22 will be engaged with the flange 15 of the base section 10.

From the foregoing it will be apparent that the reel attachment may be readily applied to an automobile wheel to cause rotation of the same for the purpose of winding wire on the drum sections 18 in the form of a coil; that the drum sections 18 may be brought to a collapsed relationship enabling the removal of the coil of wire from the drum sections 18; and that these operations may be quickly and easily carried out.

It is to be understood that the invention is not restricted to the precise arrangement of parts shown and described, as details of construction may be modified and rearranged without departing from the spirit of the invention, the scope of which is limited only by the terms of the appended claims.

I claim:

1. A reel of the class described, comprising the combination of a base section, means to secure the base section to a power driven rotary element, separate drum sections on which a coil of material may be reeled, coacting means on said drum sections and base section whereby said drum sections may be moved relatively to each other, for the purpose of removing the coil of material from the drum sections, and means operable to cause the relative movement of said drum sections to a collapsed relation so that the coil may be removed therefrom, and said means also being operable to bring said drum sections to a set relation to enable a coil of material to be reeled thereon, and said coacting means also enabling the quick detachment of said drum sections.

2. In a reel of the class described, a base section, separate drum sections on which a coil of material may be reeled, and said drum sections having shouldered hooked ends engageable with said base section, whereby said drum sections may have pivotal movement relatively to said base section, for the purpose of removing the coil of material from the drum sections.

3. In a reel of the class described, a base section, separate drum sections on which a coil of material may be reeled, and said drum sections having shouldered ends engageable with said base section, whereby said drum sections may be moved relatively to each other for the purpose of removing the coil of material from the drum sections, and pins on said drum sections engageable with said base section which prevent sidewise movement of said drum sections.

4. In a reel of the class described, a base section, separate drum sections on which a coil of material may be reeled, and said drum sections having curved reduced ends engageable in holes in said base section, whereby said drum sections may be moved relatively to each other, for the purpose of removing the coil of material from the drum sections.

FRANK V. SJOLANDER.